United States Patent
Gurdiel Gonzalez et al.

(10) Patent No.: US 11,117,326 B2
(45) Date of Patent: *Sep. 14, 2021

(54) OBJECT MODEL DIMENSION COMPENSATION FOR ADDITIVE MANUFACTURING

(71) Applicant: Hewlett-Packard Development Company, L.P., Spring, TX (US)

(72) Inventors: Enrique Gurdiel Gonzalez, Sant Cugat del Valles (ES); Jordi Sanroma Garrit, Sant Cugat del Valles (ES); Manuel Freire Garcia, Sant Cugat del Valles (ES)

(*) Notice: Subject to any disclaimer, the term of this patent is extended or adjusted under 35 U.S.C. 154(b) by 124 days.

This patent is subject to a terminal disclaimer.

(21) Appl. No.: 16/246,038

(22) Filed: Jan. 11, 2019

(65) Prior Publication Data
US 2020/0223143 A1    Jul. 16, 2020

(51) Int. Cl.
*B29C 64/393* (2017.01)
*B33Y 30/00* (2015.01)
*B33Y 50/02* (2015.01)

(52) U.S. Cl.
CPC ............. *B29C 64/393* (2017.08); *B33Y 30/00* (2014.12); *B33Y 50/02* (2014.12)

(58) Field of Classification Search
CPC ....... B29C 64/393; B33Y 30/00; B33Y 50/02; G06F 30/27; B22F 2003/1057; B22F 3/1055
USPC ........................................................ 700/119
See application file for complete search history.

(56) References Cited

U.S. PATENT DOCUMENTS

| 8,666,142 | B2 | 3/2014 | Shkolnik et al. | |
| 2014/0107823 | A1 | 4/2014 | Huang | |
| 2016/0354980 | A1* | 12/2016 | Ho | B29C 64/393 |
| 2017/0165754 | A1 | 6/2017 | Buller et al. | |
| 2017/0203515 | A1 | 7/2017 | Bennett et al. | |
| 2018/0297114 | A1 | 10/2018 | Preston et al. | |
| 2018/0307209 | A1* | 10/2018 | Chin | B22F 3/1055 |
| 2020/0004225 | A1* | 1/2020 | Buller | B29C 64/393 |
| 2020/0307174 | A1* | 10/2020 | Woytowitz | B29C 64/393 |

FOREIGN PATENT DOCUMENTS

| CN | 205553221 | 9/2016 |
| KR | 20160078093 | 7/2016 |

OTHER PUBLICATIONS

Islam, Mohammad Nazrul, et al., "Dimensional Accuracy Achievable by ThreeDimensional Printing", 2014, espace—Curtin's institutional repositor, 3 pages.

* cited by examiner

*Primary Examiner* — Kenneth M Lo
*Assistant Examiner* — Michael W Choi

(57) ABSTRACT

In an example, a method includes generating a training dataset for an inference model to generate dimensional modifications to apply to object models to compensate for departures from model dimensions in objects generated using additive manufacturing based on those object models. Generating the training dataset may include acquiring, for each of a plurality of generated objects, (i) an indication of a first dimensional inaccuracy and a second dimensional inaccuracy, wherein the first and second dimensional inaccuracies are acquired in a direction of a first axis and relate to respective first and second object dimensions; and (ii) an indication of object placement within a fabrication chamber during object generation.

5 Claims, 8 Drawing Sheets

OBJECT MODEL DIMENSION COMPENSATION FOR ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
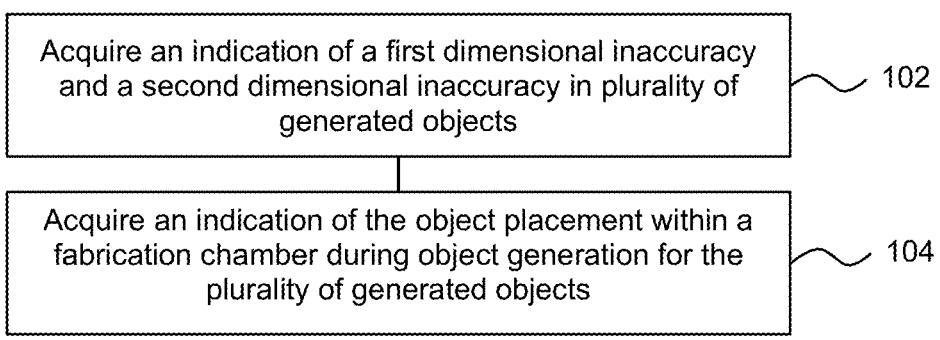
FIG. 1 is a flowchart of an example method of generating a training dataset.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies, upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise an infra-red light absorber. In one example such a fusing agent may comprise a near infra-red light absorber. In one example such a fusing agent may comprise a visible light absorber. In one example such a fusing agent may comprise a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

FIG. 1 is an example of a method, which may comprise a computer implemented method for generating a training dataset for an inference model to generate or infer dimensional modifications to apply to object models (i.e. data models of objects to be generated) to compensate for departures from model dimensions in objects generated using additive manufacturing based on those models. A 'training dataset' in this context is a set of data which is processed to allow the inference model to be 'learnt' using one or more data fitting and/or machine learning techniques. In this example, the relationships between parameters which are specified for the training datasets. In particular, as set out in greater detail below, a relationship between dimensional inaccuracies and the placement of an object in a fabrication chamber may be inferred from the training dataset and used to build the inference model.

The method may make use of data gathered from a set of objects generated using an additive manufacturing process. In some examples, these may be generated using the same class of additive manufacturing process (for example, all the objects may be generated using selective laser sintering, or all the objects may be generated using a fusing agent printed onto a layer of build material, or all the objects may be generated using some other additive manufacturing process). In other examples, all the objects may be generated using a particular class of apparatus (for example, a powder and fusing agent based 3D printing system). In some examples, all the objects may be generated using the same instance of an additive manufacturing apparatus (i.e. a particular 3D printer).

The method comprises, in block 102, acquiring, for each of a plurality of generated objects (i.e. objects generated in additive manufacturing), an indication of a first dimensional inaccuracy and a second dimensional inaccuracy, wherein the first and second dimensional inaccuracies are acquired in a direction of a first axis and relate to respective first and second object dimensions. For example, a fabrication chamber may be characterised as having X, Y and Z axes. By convention, an object may be formed in XY layers, increasing in height along the Z axis. Thus, in some examples, the first and second dimensional inaccuracies may both be inaccuracies in one of the X, Y and Z directions. In some examples, as is set out further below, third and fourth dimensional inaccuracies may be determined in a second axis, which may be orthogonal to the first axis, and relate to respective third and fourth object dimensions. In addition, fifth and sixth dimensional accuracies may be determined in a third axis, which may be orthogonal to the first and the second axis, and which relate to respective fifth and sixth object dimensions. The first, second and third orthogonal axes may correspond to the X, Y and Z axes, in any order. In some examples, block 102 may comprise measuring the objects, while in other examples, the objects may be measured separately, and the data provided for example from a memory or over a communications link or the like.

In some examples, the first and second object dimensions may be of different lengths. For example, the first object dimension may span a first number of millimetres and the second object dimension may span a second, different number of millimetres. In other examples, the first and second object dimensions may be of the same length, but taken from different points or locations on an object. Where applicable, the third and fourth object dimensions may have different lengths to each other, and the fifth and sixth object dimensions may have different lengths to each other. As is further set out below, by providing first and second object dimensions (and in some examples, any or any combination of the third, fourth, fifth and sixth object dimensions) which may have different lengths and/or be taken from different locations on an object, dimensional accuracies may be characterised in terms of differences in scale, differences in offset, and combinations thereof.

In addition, in some examples, more than two dimensional inaccuracies may be determined in each axis. This may allow a more complex relationship between scale and offset to be inferred.

The method further comprises, in block 104, acquiring, for each of the plurality of generated objects, an indication of the object placement within a fabrication chamber during object generation. For example, this may be determined based on a coordinate system. For example, a corner of the fabrication chamber may be designated as the origin and X, Y and Z offsets may be used to specify a location of an object. The location of the object when generated may, for example, be characterised as an indicative point location. For example, the location may be characterised as the coordinates of the centre of mass of the object when generated, or the volumetric centre of the object. In other examples, the indication may comprise an indication of the point on the object which is the closest to the origin in each axis, or may be defined by reference to an enclosing volume (e.g. a centre or a corner of a bounding box enclosing the object), or in some other way.

In some examples, the method may further comprise, acquiring, for each of the plurality of generated objects, an indication of the volume of that object. In some examples, this may be the volume of a bounding box, i.e. the smallest cuboid which can enclose the object. In other examples, the volume of the object may be indicated as a number of sub-volumes or voxels, i.e., three-dimensional pixels wherein each voxel occupies or represents a discrete volume. In some examples of additive manufacturing, three-dimensional space may be characterised in terms of such voxels. In some examples, the voxels are determined bearing in mind the print resolution of an object generation apparatus, such that each voxel represents a region which may be uniquely addressed when applying print agents or directing energy, and therefore the properties of one voxel may vary from those of neighbouring voxels. In other words, a voxel may correspond to a volume which can be individually addressed by an object generation apparatus (which may be a particular object generation apparatus, or a class of object generation apparatus, or the like) such that at least one property thereof can be determined at least substantially independently of that property of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape.

In some examples, the method may further comprise acquiring, for each of the plurality of generated objects, an indication of the proportion of that object which is solid. For example, the object may be a solid cuboid, in which case the proportion of the object which is solid is 100%. However, the object may alternatively comprise a hollow cuboid or a mesh defining the edges of a cuboid. In such examples, the object is less than 100% solid. In some examples, the proportion of an object which is solid may be relatively low, for example, 50%, 25%, 10% or less.

It has been noted that, given the inputs of the object placement and the dimensional inaccuracy, an inference model may be generated which provides a good prediction of the departure from model dimensions in objects which are generated using additive manufacturing. This in turn allows an inference model to be used to generate dimensional modifications to compensate for such departures from intended dimensions. The accuracy of the model may be further improved in such examples by considering object volume and/or the proportion of the object which is solid. A training dataset which includes a combination of object placement, object volume, and the proportion of the object which is solid has been shown to be particularly good for generating accurate inference models. Such inference models may be developed using of curve fitting, machine learning and/or artificial intelligence techniques.

Dimensional inaccuracies may result from thermal processes in object generation. For example, it may be the case that when an object is generated in a process which includes heat, additional build material may adhere to the object on generation. To consider a slice or layer of an object, in an example, print agent may be applied (and/or control instructions may be specified) with a resolution of around 600 dpi (dots per inch) or 1200 dpi. In other examples, other resolutions may be used for control instructions and/or print agent application. 600 dpi allows a uniquely addressable region of 42 by 42 microns in cross section, and thus voxels may be defined to relate to a 42 by 42 micron region. Print agent may be associated with a group of voxels, which in turn correspond to regions of the layer. However, when fusing agent has been applied and energy is supplied, build material of neighbouring regions/voxels may become heated and fuse to the outside of the object (in some examples, being fully or partially melted, or adhering to melted build material as powder). Therefore, a dimension of the object(s) may be larger than the regions to which fusing agent is applied. In order to compensate for the fact that objects may tend to 'grow' during manufacture in this manner, the object volume as described in object model data may be reduced.

In some examples, an object may be smaller than was specified in an original data model. This may, for example, occur due to contraction of build material on cooling. In such examples, to compensate for possible object shrinkage, the object volume as described in object model data may be increased.

In this way, the object once formed may end up being closer to an intended size.

Modelling the complex thermal relationships experienced during object generation is both intellectually and computationally difficult. However, by selecting variables which can be associated, by an inference model, with an anticipated change in dimensions, a corresponding compensation model may be derived and applied.

In some examples, the set of objects from which measurements are acquired may be at least 100, and in other examples may be many times higher, for example at least 1000, or tens or hundreds of thousands. An inference model based on a training dataset will generally improve with the size of the dataset (i.e. the number of measurement samples), but the impact of additional samples reduces as the dataset grows large. It has been shown that, when around 300,000 measurements were acquired from 25,000 objects, a highly effective inference model was developed.

Figure 2:
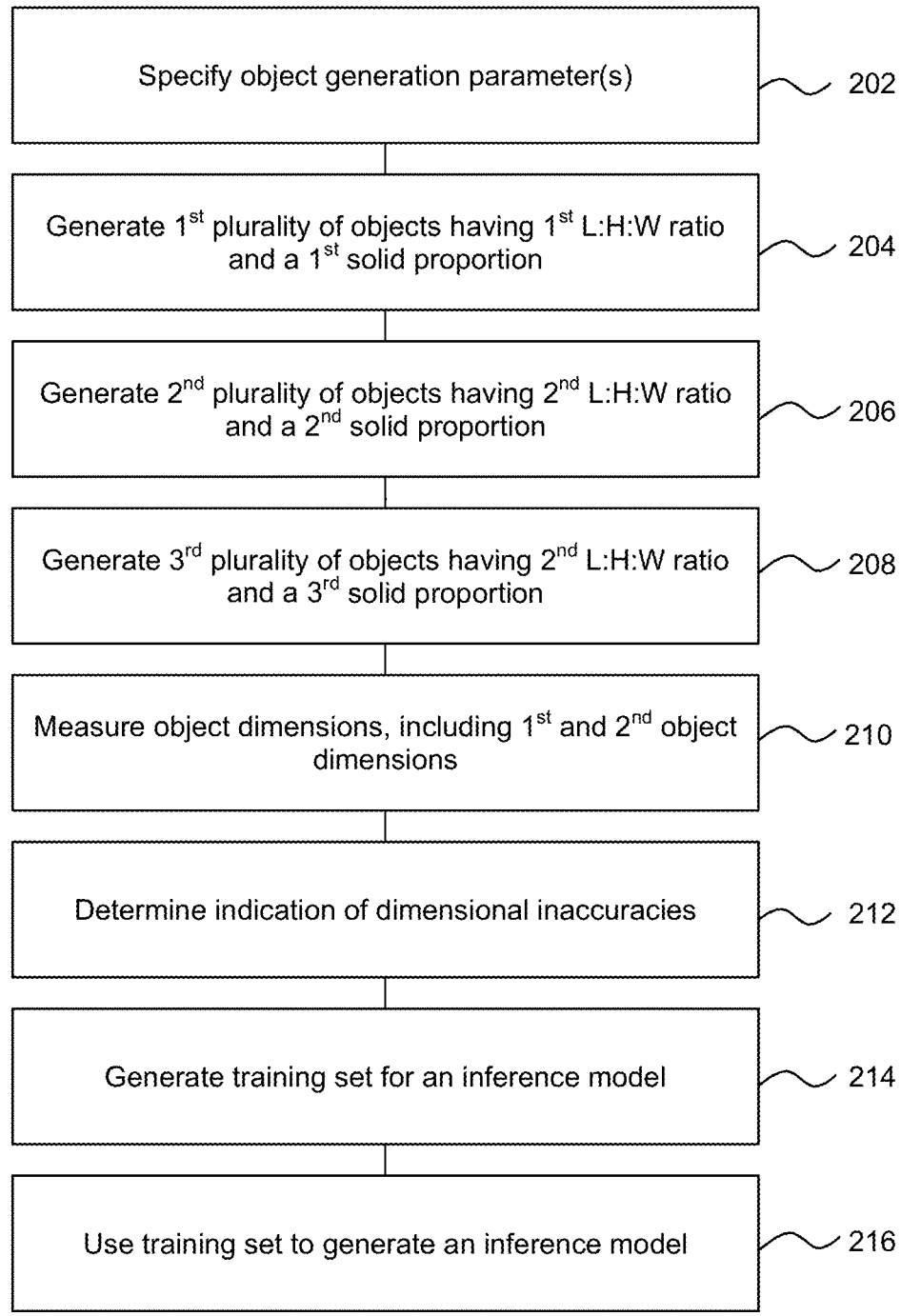
FIG. 2 is a flowchart of an example method of generating an inference model for use in additive manufacturing.

FIG. 2 is an example of a method, which may be a method of generating an inference model, comprising, in block 202, specifying at least one object generation parameter. The parameter(s) may be any parameter which may have an impact on dimensional inaccuracy. For example, the parameter(s) may comprise any, or any combination of, environmental conditions, object generation apparatus, object generation material composition, object cooling profile or print mode. These may be specified, for example, by input to at least one processor.

A specification of the environmental conditions may, for example, comprise providing any, or any combination of, an indication of the environmental temperature, humidity, air pressure or the like. It has been noted that varying the environmental conditions can result in different dimensional inaccuracies being seen in generated objects.

A specification of the object generation material composition may comprise any, or any combination of, a specification of a choice of build material and/or print agent, a source or batch of object generation material to be used, or a proportion of fresh to recycled build material. Such factors may also impact the dimensional inaccuracies seen in generated objects.

Cooling profiles may also impact dimensional inaccuracies. For example, for some build material types, cooling profiles which are relatively slow and may have less of an impact on dimensional accuracy than faster cooling profiles, which may be more likely to cause a change in object dimensions.

The choice of print mode (for example, draft/prototype/fast or detailed/slow) may also have an effect on dimensional inaccuracy, with draft, prototype or fast modes tending to be associated with greater dimensional inaccuracy than detailed or slower operational modes.

Once the object generation parameter(s) have been specified, the method continues in block 204 with generating a first plurality of objects having a first length:width:height ratio and a first solid proportion (wherein the specified object generation parameter applies during the object generation operation). The instances of the first plurality of objects are generated in different positions within the fabrication chamber. In one example, a plurality of instances of the first object may be generated in a single fabrication chamber, each occupying a different volume thereof.

The objects may be generated by object generation apparatus using object generation instructions, which may be generated from a data model of the object (also referred to herein an object model, or object model data). In some examples, the objects may be generated in a plurality of layers by selectively solidifying portions of layers of build material. The selective solidification may in some examples be achieved by selectively applying print agents, for example through use of 'inkjet' liquid distribution technologies, and applying energy, for example heat, to the layer. In other examples, the objects may be generated using directed energy (for example laser sintering), by applying chemicals which cause an underlying build material to solidify or cohere or coalesce, or in some other way.

Block 206 comprises generating a second plurality of objects having a second length:width:height ratio (which is different from the first length:width:height ratio) and a second solid proportion (which may be the same or different to the first solid proportion). The instances of the second plurality of objects are generated in different positions within the fabrication chamber. In one example, a plurality of instances of the second object may be generated in a single fabrication chamber, each occupying a different volume thereof.

The first and second length:width:height ratios may be different in that, in the case of the first length:width:height ratio, one of the length, width, and height may be significantly greater than the other two. For example, the length may be at least twice, or at least three times, or at least five times greater than the width and/or the height. In some examples, the length may be at least ten times greater than the width and/or the height.

Block 208 comprises generating a third plurality of objects having the second length:width:height ratio and a third solid proportion (which is different to the first solid proportion). The instances of the third plurality of objects are generated in different positions within the fabrication chamber. In one example, a plurality of instances of the third object may be generated in a single fabrication chamber, each occupying a different volume thereof, and/or may be generated within a single fabrication chamber with at least one instance of the first and/or second object.

The training objects may be generated over time, for example along with 'production' print jobs. For example, such objects may be included in a calibration exercise, or in a print job with available space. In some examples, blocks 204-208 may be carried out concurrently, i.e. one or a plurality of instances of the first, second and third object may be generated together in a single fabrication chamber.

The objects may be generated having different rotations. For example, a first instance of the first object may be generated in a first orientation and a second instance of the first object may be generated 'upside down' relative to the first orientation.

In some examples, the objects may be printed to include an indicia of at least one applicable parameter (for example, including an alphanumeric reference number shown in relief, or detectable in some other way). This may assist in building the training dataset.

By generating a mixture of objects having different length:width:height ratios, different information about the types of dimensional inaccuracy associated with those object generation parameter(s) may be acquired. For example, a relatively long and thin object (for example having a length: width:height ratio on the order of 10:2:1, or 20:2:1) may provide data which may assist in distinguishing differences between the various dimensions. For example, if the long axis of an object is aligned with the x-axis, (or any arbitrary axis) this will emphasise dimensional inaccuracies in the x-axis. Alternatively, when the long axis is oriented in the y-axis, this will emphasise directional inaccuracies in the y-axis.

In addition, a relatively long object may provide a good sampling of a region of the fabrication chamber while providing such an object which is relatively thin may also allow a reasonably high number of such objects to be generated in a single manufacturing operation, and/or such objects may be included in any other print job without unduly taking up space within a fabrication chamber, which may speed up the process of acquiring a training dataset.

Objects with a small length:width:height ratio, for example, length:width:height ratio of, or relatively close to, 1:1:1, will sample all axes substantially evenly. Thus, these may provide a good indication of the respective inaccuracies in the direction of each axis.

Generating a plurality of objects with different solid proportions may allow an inference to be made about the impact of the solidity of an object on its dimensional accuracy. The solid proportion of an object may be defined as the proportion of the object within its outer perimeter which is solid. For example, an object which is mostly solid (for example, 80% solid, or 90% solid, or 100% solid) may generally hold more energy in the form of heat than an equivalent object during object generation which contains more empty space, for example, having the form of a frame or a hollow object), and may therefore have a greater tendency to 'grow' i.e. build material which is not intended to form part of the object may melt or otherwise adhere to the outer surfaces of the object. Providing a set of training objects which have different amounts of solid proportions allows this relationship to be inferred. For example, some training objects may be provided which are at least 80%, 90% or 100% solid, whereas other training objects may be provided which are less than 50%, 40% or 30% solid.

The object(s) may be selected or designed so as to provide easily characterisable dimensions. Examples of such objects are set out in relation to FIG. 3A to 3C below. In some examples, the proportion of the object which is solid may be variable and a first dimension may relate to a portion of the object having a first proportion which is solid and the second dimension may relate to a portion of the object having a second, different, solid proportion.

Block 210 comprises measuring various object dimensions, including at least the first and second object dimensions, and in some examples, the third, fourth, fifth and sixth object dimensions. In other examples, more than two dimensions may be measured in each axis. For example, these dimensions may be measured by a 3D scanner, manually, optically, automatically or in some other way.

In block 212, an indication of dimensional inaccuracies is determined for each of the measured dimensions. This may comprise comparing the measured dimensions to the original model dimensions.

Block 214 comprises generating a training dataset for an inference model as described in relation to FIG. 1, which in this example has been generated using a training dataset which included an indication of object volume and an indication of the proportion of each object which is solid. Block 216 comprises using the training dataset to generate an inference model which is to indicate, for a given intended object placement within a fabrication chamber during object generation, a given intended object volume, and a given proportion of the object volume which is intended to be solid, a dimensional modification comprising at least one of a scaling factor and an offset factor to apply to the model (which factors are described in greater detail below). In some examples, both may be generated, but the scaling factor may be set to 1 if no scaling is indicated, and the offset factor may be set to 0 if no offset is indicated.

Thus, the inference model generated in FIG. 2 may be used to process subsequently received object model data to determine modification to apply thereto prior to generating instructions to generate the object.

In some examples, generating the inference model may comprise, for example, carrying out a function approximation for data interpolation operations on the training dataset. For example, the inference model may be generated using curve fitting, in some examples using spline based data interpolation techniques, for example based on thin-plate splines. In other examples, other methods may be used, for example other polyharmonic data fitting techniques (for example other polyharmonic splines) and/or data regression such as Support Vector Machine regression smoothing techniques. The inference model may be realised as an algorithm, a lookup table, a neural network with programmed weights or may be represented in some other way.

In this example, the dimensional modification output comprises at least one of a scaling factor and/or an offset factor. A scaling factor may be used to multiply all specified dimensions in direction of the first axis by value, which may be greater than 1 in order to increase the dimensions and less than 1 to reduce the dimensions. An offset factor may specify, for example by a specified distance or a number of voxels, an amount to add or remove from a surface of the object (or a perimeter within a layer). For example, a distance as measured in the direction of a normal from the object surface may be specified and the object may be eroded or inflated (enlarged) by this distance.

By providing a model generated using first and second dimensional inaccuracies which relate to object placement (and in some examples, to the object volume and/or the proportion of the object volume which is solid), the offset and the scale differences may be identified. For example, if the two dimensions have increased by the same factor, then the inaccuracy may be compensated for by use of a scaling factor. If however the two dimensions have increased by the same distance value, this may be compensated for by use of an offset. A combination of these factors could be used to compensate for dimensional inaccuracies in other examples. Although two measurements are described in relation to a particular dimension in this example, in some examples there may be more, which would allow more complex relationships between scaling and offset to be inferred.

Therefore, in some examples, there may be at least three measured object dimensions in at least one axis, or at least four, or at least five, or the like.

In one example, the inference model may be designed to indicate three scaling factors (one for each of the three orthogonal dimensions) and three offset factors (one for each of the three orthogonal dimensions). As noted above, if scaling is not indicated in a given dimension, the scaling factor in relation to that dimension may be set to 0, and if no offset is indicated in a given dimension, the offset factor in relation to that dimension may be set to 0.

In practice, using the methods set out above, the factor(s) to be applied to a particular object will be inferred by the inference model, characterising the relationship between the input indications of object placement, object volume and solid proportions of the object to the dimensional inaccuracies derived from analysis of the training dataset.

Thus, thermal analysis and theory need not be applied when generating a compensation model. Instead, an inferred relationship has been developed by providing a training dataset having appropriate characteristics. This model may be used to generate objects with a higher degree of dimensional accuracy.

In some examples, the method may be repeated with different object generation parameter(s) being applied. In this way, a number of training datasets may be generated and associated with the applied object generation parameter(s).

Figure 3A:
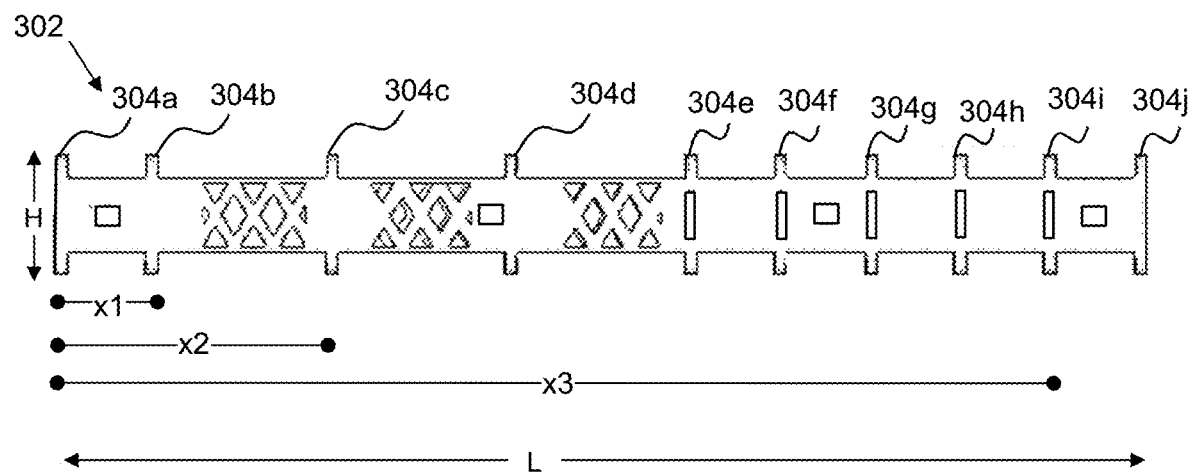
FIGS. 3A-3C show examples of objects which may form the basis of a training dataset in some examples.
Figure 3B:
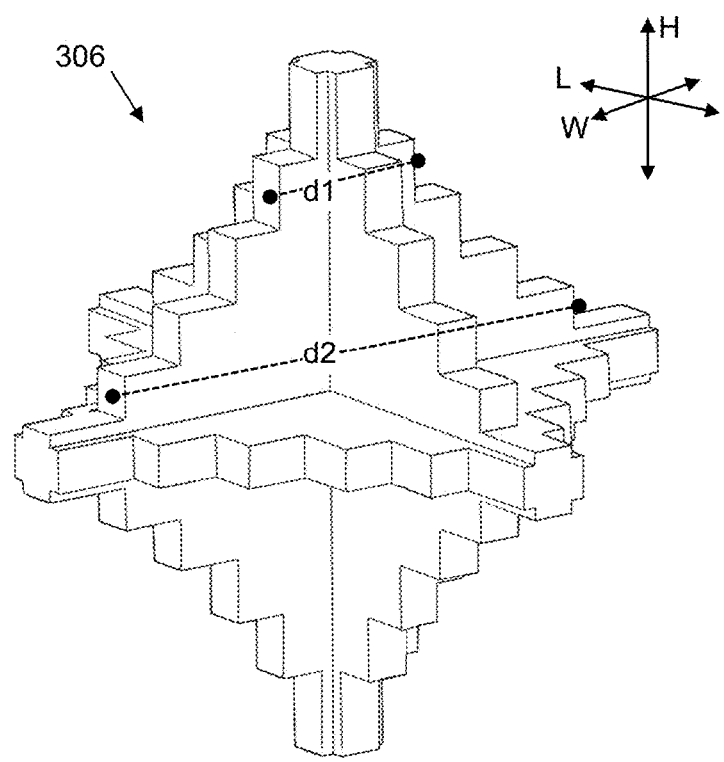
Figure 3C:
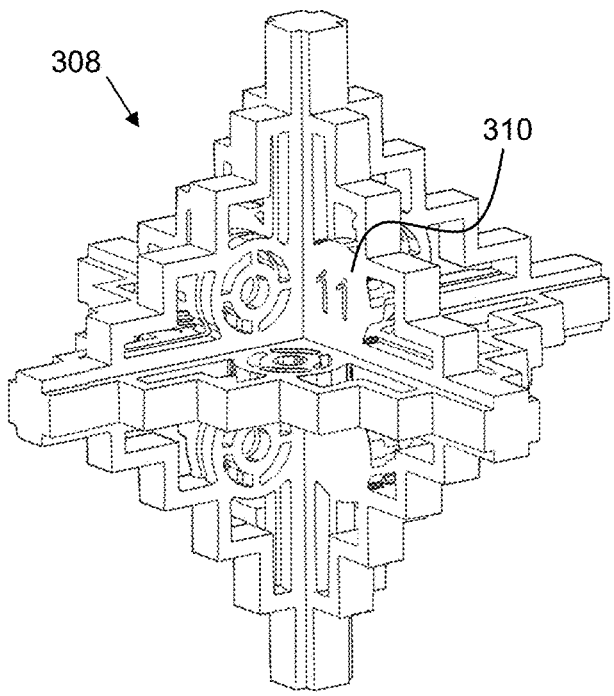

FIGS. 3A-3C show examples of objects which may be used as the basis for deriving a training dataset. FIG. 3A shows a relatively elongate cuboid object 302 (i.e. an object having a L:H:W ratio of around 20:2:1, with the width of the object 302 being in the plane of the page), and having protrusions 304a-j along two opposed edge thereof. The protrusions 304 provide easily accessed and identified measurement points, allowing different dimensions to be readily evaluated. Three such dimensions are marked (x1, x2 and x3), although it will be appreciated that many more possible exist, allowing a number of measurements to be acquired along the length of the object. Thus, in this example, dimensions may be measured which are offset from one another along a particular axis aligned with the length L. This may therefore allow the magnitude of inaccuracies seen in different regions of a fabrication chamber to be characterised.

In this example, by virtue of a number of holes provided towards one end of the object 302, the object 302 has a variable mass distribution. As a result, the portion of the measured object which is solid varies within the object itself. Thus, the proportion of the object which is solid when considering the dimension x1 is smaller than the proportion of the object which is solid when considering the dimension x3. Providing such an object may assist in inferring relationships between the proportion of an object which is solid and its dimensional inaccuracy.

FIG. 3B shows an example object 306 having a relatively balanced L:H:W ratio (i.e. at or close to 1:1:1, as measured along the marked axes) which has the form of two stepped pyramids joined base to base. The steps of the pyramids provide easily accessed and identified measurement points. As can be seen, in this example, there are eleven 'plateaus' to measure along each dimension. Two dimensions which may be readily measured, d1 and d2, are marked by way of example. In this example, the object 306 is 100% solid within its outer perimeter.

FIG. 3C shows a third object 308, which is similar in form to that shown in FIG. 3B and has the same L:H:W ratio. However, the third object 308 has a lower solid proportion than the object 306 of FIG. 3B, having a number of cut-outs/holes therein. The proportion of the third object 308 which is solid may for example be around 50%. In this example, the third object 308 is printed with an identifier 310 of object generation parameters, in this example bearing a number indicated the type of build material used in object generation.

A set of objects having such characteristics, or a subset thereof, allow different aspects of the dimensional inaccuracy to be sampled. This therefore provides an effective training dataset for developing an inference model. It will be appreciated that application of this model is not limited to such objects. The production of such objects allows the fabrication space to be sampled and inferences may be drawn therefrom. This may, for example, make use of curve fitting, machine learning and/or artificial intelligence techniques.

Figure 4:
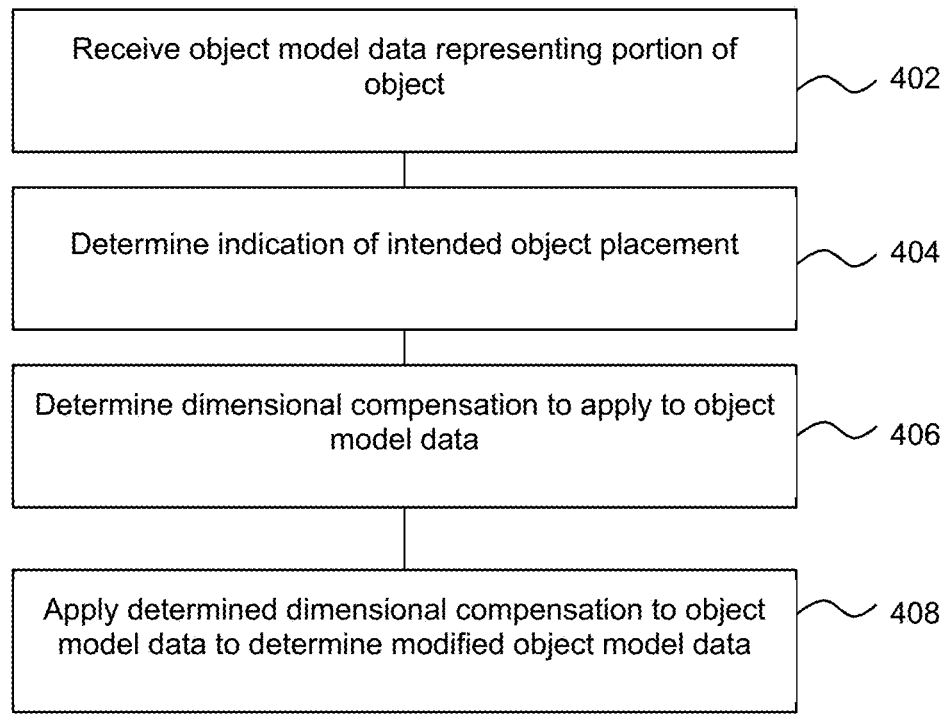
FIG. 4 is a flowchart of an example method of modifying object model data.

FIG. 4 is an example of a method, which may comprise a computer implemented method of modifying object model data.

The method comprises, in block 402, receiving, at least one processor, object model data representing at least a portion of an object.

The object represented by the object model data is to be generated by an additive manufacturing apparatus by fusing build material. The object model may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object region as a plurality of sub-volumes, wherein each sub-volume represents a region of the object which is individually addressable in object generation. In some examples herein, the sub-volumes may be referred to as voxels, i.e. three-dimensional pixels.

The method further comprises in block 404, determining, using at least one processor, an indication of an intended object placement within the fabrication chamber (for example, a point location such as a centre point). In some examples, the method may further comprise determining an indication of the object volume and/or determining an indication of the proportion of the object volume which is solid.

Block 406 comprises determining, using at least one processor, a dimensional compensation to apply to the object model data, wherein the dimensional compensation is determined using a predetermined relationship relating indications of the intended placement (and, in some examples, intended object volume and proportion of the object volume which is solid) to dimensional compensations. For example, the relationship may be specified as any or any combination of at least one predetermined algorithm, at least one look-up table, at least one neural network with programmed weights.

The predetermined relationship may comprise an inference model, which may be generated using the training dataset described in relation to FIGS. 1-3 and which is configured to indicate, for a given intended object placement within a fabrication chamber during object generation (and, in some examples, intended object volume and/or proportion of the object volume which is intended to be solid), a dimensional modification comprising at least one of a scaling factor and an offset factor to apply to the object model. In some examples, each dimensional compensation specifies at least one scaling factor and/or at least one offset factor.

Block 408 comprises applying, using at least one processor, the determined dimensional compensation to the object model data to determine modified object model data. In some examples, where the object model data is described in terms of sub-volumes, such sub-volumes may be added or removed (eroded). Where the object is, for example, described as a mesh model or the like, the mesh model may be adjusted, expanded or contracted as set out by the determined dimensional compensation.

In one example, the dimensional compensation may indicate three scaling factors (one for each of the three orthogonal dimensions) and three offset factors (one for each of the three orthogonal dimensions). As noted above, if scaling is not indicated in a given dimension, the scaling factor in relation to that dimension may be set to 1, and if no offset is indicated in a given dimension, the offset factor in relation to that dimension may be set to 0.

Figure 5:
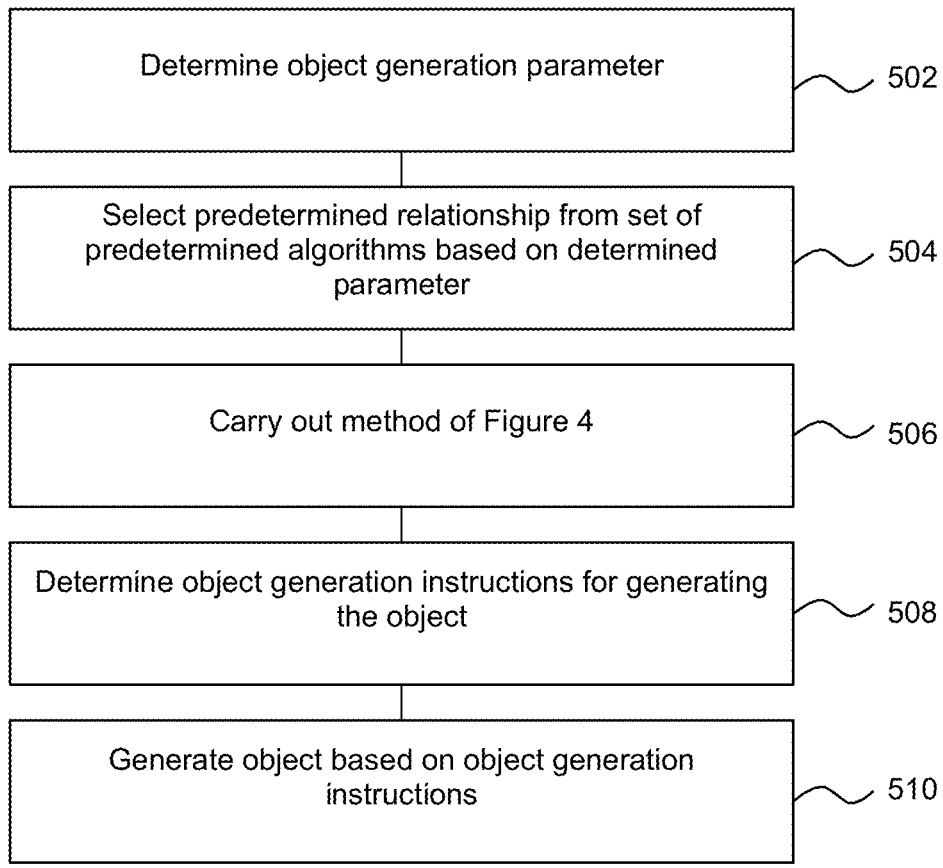
FIG. 5 is a flowchart of an example method of object generation.

FIG. 5 is an example method of object generation, comprising, in block 502, determining at least one object generation parameter. The determined object generation parameter may be indicative of at least one of (i) an environmental condition (ii) an intended object generation apparatus, (iii) an intended object generation material composition, (iv) an intended object cooling profile, (v) an intended print mode.

Block 504 comprises selecting a predetermined relationship (e.g. algorithm, look-up table, neural network with programmed weights, or the like) from a set of predetermined relationships based on the determined at least one parameter. As noted above, different parameters may be associated with characteristic inaccuracies, and therefore different relationships to produce different compensations may be derived.

Block 506 comprises carrying out the method of FIG. 4. The output of the method of FIG. 4 is modified object data. The method of FIG. 5 further comprises, in block 508, determining object generation instructions for generating the object, the object generation instructions specifying an amount of print agent to be applied to each of a plurality of locations on a layer of build material. The object generation instructions may be generated with respect to the modified object model data. For example, generating object generation instructions may comprise determining 'slices' of the selected virtual build volume, and rasterising these slices into pixels (or voxels, i.e. three-dimensional pixels). An amount of print agent (or no print agent) may be associated with each of the pixels/voxels. For example, if a pixel relates to a region of a build volume which is intended to solidify, the print instructions may be generated to specify that fusing agent should be applied to a corresponding region of build material in object generation. If however a pixel relates to a region of the build volume which is intended to remain unsolidified, then object generation instructions may be generated to specify that no agent, or a coalescence modifying agent such as a detailing agent, may be applied thereto. In addition, the amounts of such agents may be specified in the generated instructions and these amounts may be determined based on, for example, thermal considerations and the like.

Block 510 comprises generating an object based on the object generation instructions. For example, such an object may be generated layer by layer as set out above. For example, this may comprise forming a layer of build material, applying print agents, for example through use of 'inkjet' liquid distribution technologies in locations specified in the object generation instructions for an object model slice corresponding to that layer, and using at least one print agent applicator, and applying energy, for example heat, to the layer. Some techniques allow for accurate placement of print agent on a build material, for example by using printheads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice.

In some examples, the methods set out herein may be combined with other methods of object model modification. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

While in this example, the modification to the data was made before object generation instructions were determined, this need not be the case in all examples.

Figure 6:
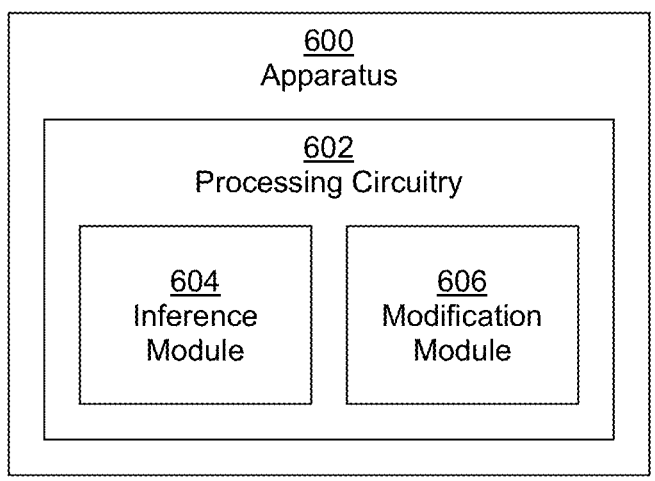
FIGS. 6 and 7 are simplified schematic drawings of example apparatus for additive manufacturing.

FIG. 6 shows an apparatus 600 comprising processing circuitry 602. The processing circuitry 602 comprises an inference module 604 and a modification module 606.

The inference module 604, in use of the apparatus 600, infers a dimensional compensation to apply to object model data describing an object to be generated in additive manufacturing. The dimensional compensation is inferred from (i) an intended object placement within the fabrication chamber, (ii) object volume and (iii) a proportion of the object volume which is intended to be solid, and is determined using a predetermined relationship. The predetermined relationship may be an inference model as described above, for example an inference model as generated based on the training dataset of FIG. 1 (wherein the model may be generated with reference to object volume and/or the proportion of the object which is solid in addition to the intended object placement) or as generated in the method set out in FIG. 2. The inference model may, in some examples, be stored in a memory of the apparatus 600.

The modification module 606, in use of the apparatus 600, determines modification data, wherein the modification data is indicative of a modification of the object model data, the modification data being to modify the object model data using the dimensional compensation.

Figure 7:
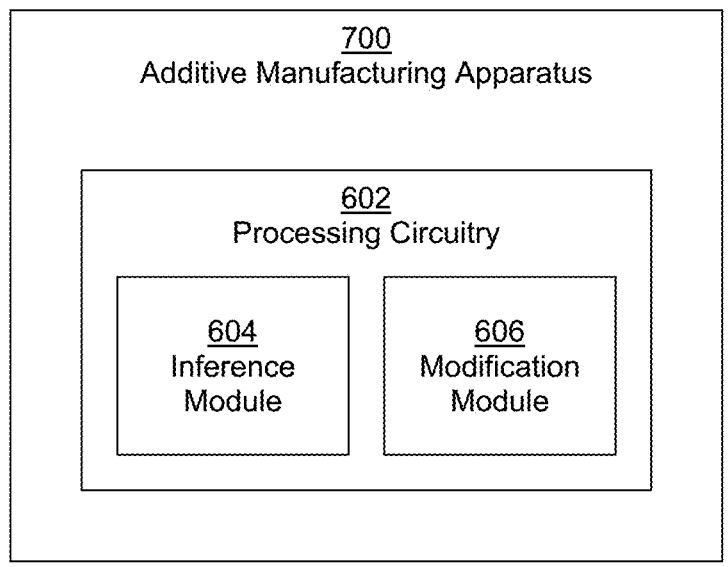

FIG. 7 shows additive manufacturing apparatus 700 to generate an object comprising the processing circuitry 602 of FIG. 6. The additive manufacturing apparatus 700, in use thereof, generates the object in a plurality of layers (which may correspond to respective slices of an object model) according to control data. The additive manufacturing apparatus 700 may for example generate an object in a layer-wise manner by selectively solidifying portions of layers of build materials. The selective solidification may in some examples be achieved by selectively applying print agents, for example through use of 'inkjet' liquid distribution technologies, and applying energy, for example heat, to the layer. The additive manufacturing apparatus 700 may comprise additional components not shown herein, for example any or any combination of a fabrication chamber, a print bed, print head(s) for distributing print agents, a build material distribution system for providing layers of build material, energy sources such as heat lamps and the like.

The control data may be generated by the processing circuitry 602. The generated control data may, in use thereof, control the additive manufacturing apparatus 700 to generate each of a plurality of layers of the object. This may for example comprise specifying area coverage(s) for print agents such as fusing agents, colorants, detailing agents and the like. In some examples, object generation parameters are associated with object model sub-volumes ('voxels'). In some examples, other parameters, such as any, or any combination of heating temperatures, build material choices, an intent of the print mode, and the like, may be specified. In some examples, halftoning may be applied to determined object generation parameters to determine where to place fusing agent or the like. The control data may be specified in association with sub-volumes. In some examples, the control data comprises a print agent amount associated with sub-volumes.

The processing circuitry 602 or the modules thereof may carry out any of the blocks of FIG. 1, or FIG. 4, or any of blocks 202 or 210 to 216 of FIG. 2 or blocks 502 to 508 of FIG. 5, or may cause additive manufacturing apparatus to carry out any of blocks 204 to 208.

Figure 8:
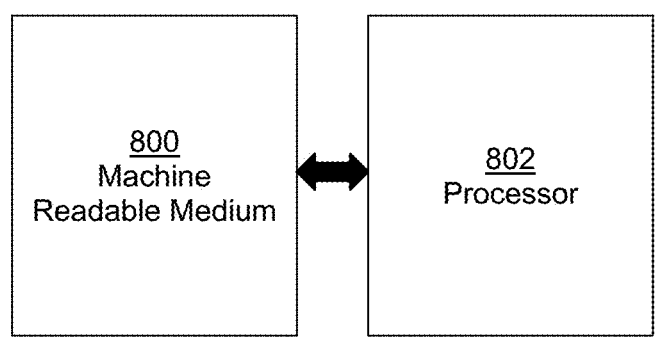
FIG. 8 is a simplified schematic drawing of an example machine readable medium associated with a processor.

FIG. 8 shows a machine readable medium 800 associated with a processor 802. The machine readable medium 800 comprises instructions which, when executed by the processor 802, cause the processor 802 to carry out any of the blocks of FIG. 1, or FIG. 4, or any of blocks 202 or 210 to 216 of FIG. 2 or blocks 502 to 508 of FIG. 5, or may cause additive manufacturing apparatus to carry out any of blocks 204 to 208 of FIG. 2. In some examples, the instructions may cause the processor to act as any part of the processing circuitry 602 of FIG. 6.

Figure 9A:
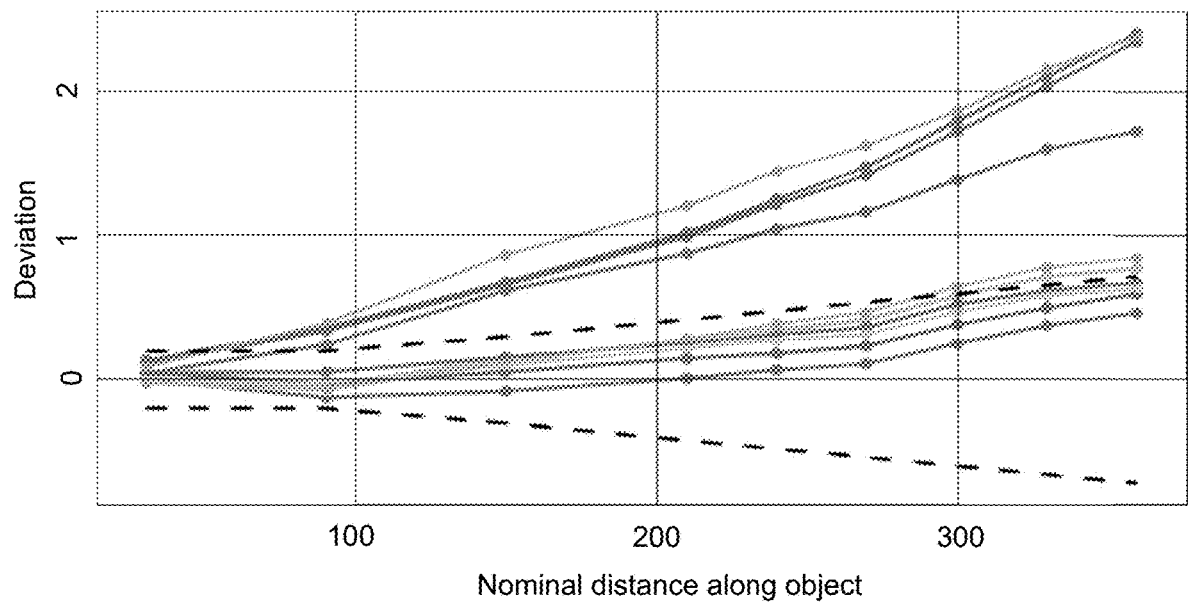
FIGS. 9A and 9B show comparative examples of dimensional inaccuracies to demonstrate an example of the efficacy of an example method as set out herein.

FIG. 9A shows an example of dimensional errors along a representative axis in ten objects which were generated without use of the methods described herein. The dotted lines mark a target tolerance threshold.

In this example, the objects were similar in form to those shown in FIG. 3A being relatively elongate. Each line relates to a different object and the data points show a deviation from an expected length at a number of points at different distances (in a nominal unit) along the object. In this example, the deviations tend to add along the object, and therefore the curve for each object trends upwards as the cumulative deviation grows, and in the case of several objects exceeds the target tolerance threshold.

Figure 9B:
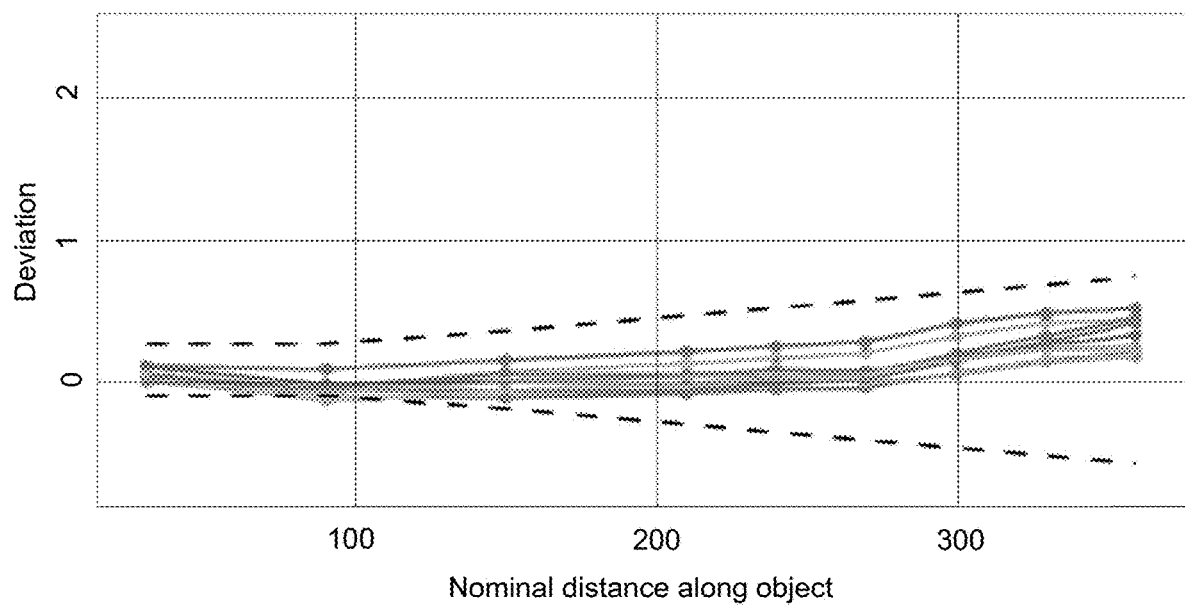

The same ten objects were then generated using the methods set out herein, and the result is shown in FIG. 9B. As can be seen, the dimensional accuracy has been increased.

Figure 9C:
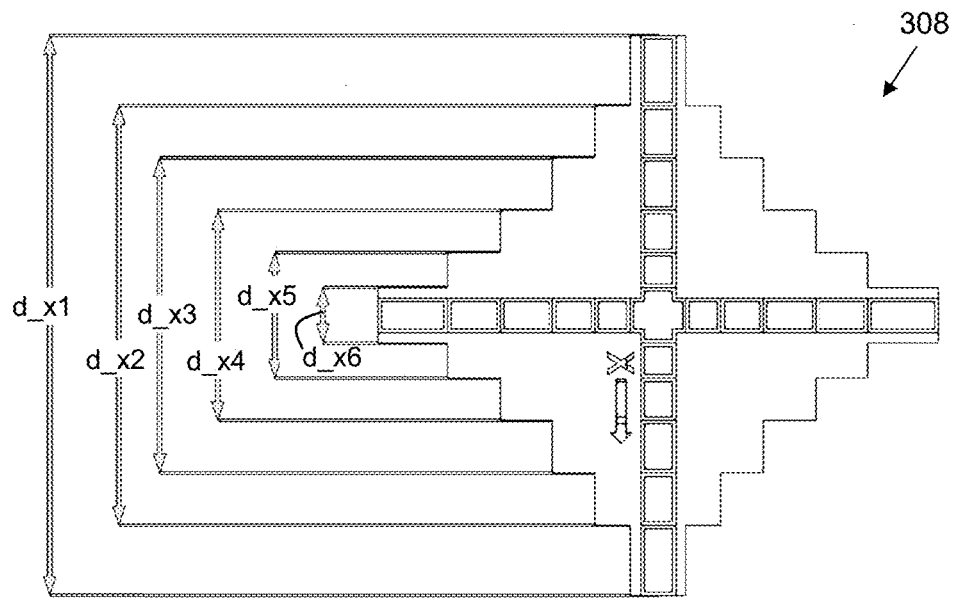
FIGS. 9C and 9D show examples of the data acquired for training datasets used to produce objects.
Figure 9D:
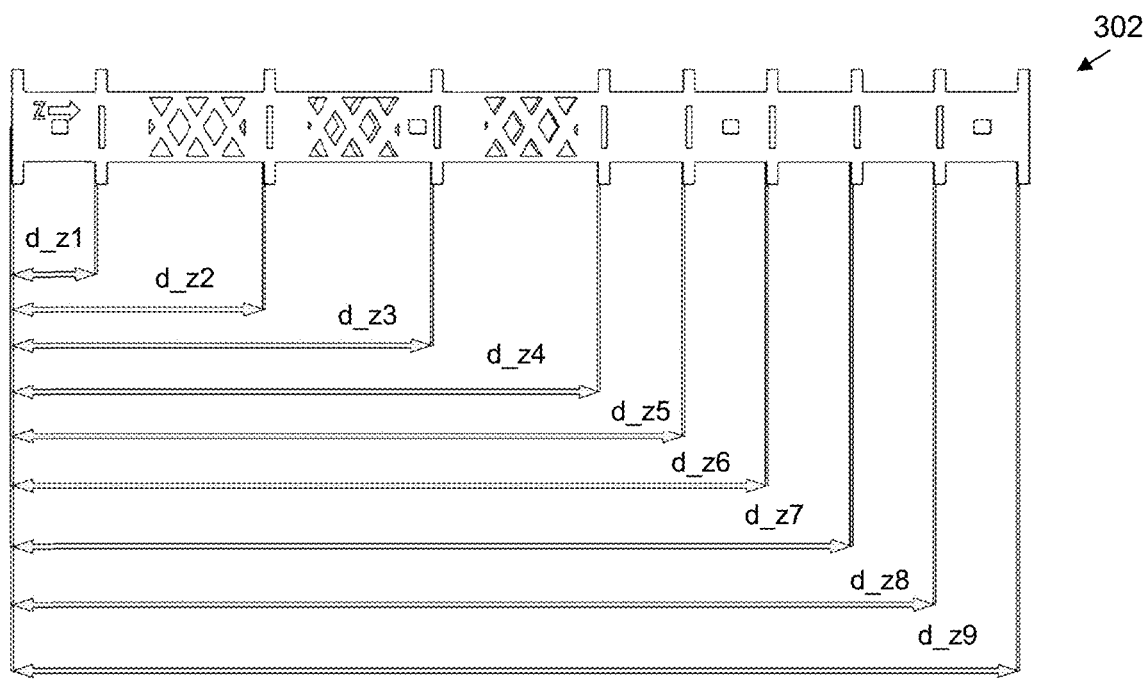

In this example, a training dataset was gathered from three different object generation operations. A first object generation operation generated, in a single fabrication chamber, 122 'pyramid' objects 308 as shown in FIG. 3C and ten elongate objects 302 as shown in FIG. 3A. The 'pyramid' objects 308 were arranged in a regular distribution with the objects 302 orient such that their length was vertical. Around 2300 measurements were taken from these objects, as shown in FIGS. 9C and 9D. Six measurements in each dimension were taken from each 'pyramid' object 308, each dimension being symmetrical about an orthogonal centre line through the object as shown for the X dimension in FIG. 9C ($d\_x1$ to $d\_x6$), such that 18 measurements were taken for each object generated. The dimensions for each object was intended to be, respectively, 80 mm for $d\_x1$. 60 mm for $d\_x2$, 45 mm for $d\_x3$, 40 mm for $d\_x4$, 18 mm for $d\_x5$ and 8 mm for $d\_x6$. Corresponding measurements were taken for the Y and Z dimensions.

Nine dimensions were taken from each of the elongate objects 302 ($d\_z2$ to $d\_z9$) as shown in FIG. 9D, each having a common start location. The measurements were intended to be 30 mm for $d\_z1$, 90 mm for $d\_z2$, 150 mm mm for $d\_z3$, 210 mm for $d\_z4$, 240 mm for $d\_z5$, 270 mm for $d\_z6$, 300 mm for $d\_z7$, 330 mm for $d\_z8$ and 360 mm for $d\_z9$.

The training dataset was compiled using deviations from these intended dimensions noting the location of the centre of mass for that object 308, 302 as an xyz location within the coordinate system of a fabrication chamber (where 0,0,0 is corner of the fabrication chamber). In this example, the measurements were acquired using a 3D scanner. This provided around 2300 measurements for the training dataset.

In some examples, outliers may be disregarded from a training dataset, for example by considering the distance of each measured value from a mean of corresponding values and disregarding those which are more than a threshold distance from the mean.

In a second and third object generation operation, 133 'pyramid' objects 308 were generated with a random position, and measured as set out above, each providing a location within the fabrication chamber and 18 associated measurements. Each of the second and third object generation operation therefore added around 2400 measurements to the training dataset, providing a dataset made up of around 7100 measurements. Of course, this is just one example, and more or fewer measurements may be taken in other examples, and/or different objects may be used.

In this example, a thin plate spline method was used to model an expected offset and gain for each xyz location in each of the X, Y and Z directions. As in this example there were three descriptors of the part (the xyz locations), thin plate spline was a suitable method although if additional descriptors (e.g. solid proportion and/or volume) were used, this may imply the use of an alternative method, such as Support Vector Machine regression, or the like.

The objects printed and measured to produce the output shown in FIG. 9B were oriented in the Z dimension.

In data science, the variables used to describe a sample (in this example, its xyz location) may be termed 'predictors' and the output predicted result (in this example, the deviation from the intended length in the Z dimension) is called the response.

In this example, the dependency of the deviation on the position of the object was to be inferred. Estimators were derived by fitting the dependency between the measurements taken to provide the dataset and the expected dimensions as a straight line: the intercept provides an estimation of the offset and the slope provides an estimation of the scale factor. Once the expected deviation is known, a compensation may be applied to model data and/or to print instructions such that, when printed, the object conforms to more accurately to expected or intended dimensions.

As can be seen from FIG. 9B, the dimensional accuracy is greatly improved for all objects, and this is particularly marked for the longer measurements.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the inference module 604 and a modification module 606) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for generating objects with an additive manufacturing apparatus by fusing build material within a fabrication chamber, the method comprising:
   generating a plurality of training objects in different positions within the fabrication chamber;
   measuring a dimension of each of the training objects;
   based on the measuring, determining a dimensional compensation to compensate for departures from model dimensions associated with the position of an object in the fabrication chamber;
   receiving object model data representing an object to be generated;
   determining an indication of an intended position of the object within the fabrication chamber;
   applying the determined dimensional compensation to the object model data to determine modified object model data; and
   generating the object from the modified object model data.

2. A method according to claim 1 in which the dimensional compensation specifies at least one of a scaling factor and an offset factor.

3. A method according to claim 2 in which the dimensional compensation comprises three scaling factors and three offset factors, wherein each of the scaling factors and each of the offset factors is associated with one of three orthogonal axes.

4. A method according to claim 1 further comprising
   determining an indication of the object volume and an indication of a proportion of the object volume which is solid; and
   using a predetermined relationship relating indications of the intended object position-, indications of an-object volume and indications of a proportion of the object volume which is solid to determine the dimensional compensation.

5. A tangible non-transitory machine readable medium having instructions that, when executed:
   cause a processor to infer a dimensional compensation applicable to object model data to compensate for departures from model dimensions associated with the position of an object in an additive manufacturing fabrication chamber, from:
      an intended object placement within the fabrication chamber, object volume, and
      a proportion of the object volume which is intended to be solid;
   cause the processor to modify the object model data using the dimensional compensation; and
   cause the additive manufacturing apparatus to generate the object from the modified object model data.

* * * * *